(12) United States Patent
Mishra et al.

(10) Patent No.: US 11,997,005 B2
(45) Date of Patent: *May 28, 2024

(54) BIER OVERLAY SIGNALING ENHANCEMENT

(71) Applicant: Cisco Technology, Inc., San Jose, CA (US)

(72) Inventors: Mankamana Prasad Mishra, San Jose, CA (US); Ijsbrand Wijnands, Leuven (BE); Anuj Budhiraja, San Jose, CA (US); Ali Sajassi, San Ramon, CA (US); Stephane Litkowski, Liffre (FR); Satya Ranjan Mohanty, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/166,775

(22) Filed: Feb. 9, 2023

(65) Prior Publication Data

US 2023/0188457 A1 Jun. 15, 2023

Related U.S. Application Data

(63) Continuation of application No. 17/361,510, filed on Jun. 29, 2021, now Pat. No. 11,627,071, which is a (Continued)

(51) Int. Cl.
*H04L 45/00* (2022.01)
*H04L 12/18* (2006.01)
(Continued)

(52) U.S. Cl.
CPC ............ *H04L 45/16* (2013.01); *H04L 12/185* (2013.01); *H04L 12/1886* (2013.01);
(Continued)

(58) Field of Classification Search
None
See application file for complete search history.

(56) References Cited

U.S. PATENT DOCUMENTS

7,039,687 B1 5/2006 Jamieson et al.
8,918,466 B2 12/2014 Yu
(Continued)

FOREIGN PATENT DOCUMENTS

CN 109756425 A 5/2019
CN 110460522 A 11/2019
(Continued)

OTHER PUBLICATIONS

E. Rosen, Ed. et al., "Multicast VPN Using Bit Index Explicit Replication (BIER)", Internet Engineering Task Force (IETF), Request for Comments: 8556, Category: Standards Track, ISSN: 2070-1721, https://www.rfc-editor.org/rfc/rfc8556.html, Apr. 2018, 17 pages.
(Continued)

*Primary Examiner* — Gerald A Smarth
(74) *Attorney, Agent, or Firm* — Edell, Shapiro & Finnan, LLC

(57) ABSTRACT

A method comprises, at a first router configured to perform Bit Index Explicit Replication (BIER) for forwarding of multicast packets in a network, storing configuration information that indicates that the first router belongs to multiple subdomains of a BIER domain, and is able to forward the multicast packets for a virtual private network on the multiple subdomains. The method further comprises, during an auto-discovery procedure, generating an auto-discovery message to include an auto-discovery route and route attributes that indicate the multiple subdomains, and sending the auto-discovery message to a second router of the virtual private network the network.

20 Claims, 11 Drawing Sheets

Related U.S. Application Data continuation of application No. 17/090,579, filed on Nov. 5, 2020, now Pat. No. 11,102,107.

(60) Provisional application No. 63/090,517, filed on Oct. 12, 2020.

(51) Int. Cl.
*H04L 12/46* (2006.01)
*H04L 45/02* (2022.01)
*H04L 45/16* (2022.01)
*H04L 45/586* (2022.01)

(52) U.S. Cl.
CPC .......... *H04L 12/4641* (2013.01); *H04L 45/02* (2013.01); *H04L 45/586* (2013.01)

(56) References Cited

U.S. PATENT DOCUMENTS

| | | | |
|---|---|---|---|
| 9,438,432 | B2 | 9/2016 | Shepherd et al. |
| 9,548,960 | B2 | 1/2017 | Haramaty et al. |
| 9,660,898 | B2 | 5/2017 | Peter et al. |
| 10,218,524 | B2 | 2/2019 | Wijnands et al. |
| 10,587,495 | B2 * | 3/2020 | Dutta ..................... H04L 45/48 |
| 2003/0053467 | A1 * | 3/2003 | Miyamoto ............ H04L 69/161 |
| | | | 370/395.1 |
| 2006/0262772 | A1 | 11/2006 | Guichard et al. |
| 2008/0062891 | A1 | 3/2008 | Van der Merwe et al. |
| 2011/0116373 | A1 * | 5/2011 | Lauer .................. H04W 84/005 |
| | | | 370/232 |
| 2012/0170578 | A1 | 7/2012 | Anumala et al. |
| 2015/0350280 | A1 | 12/2015 | Roverso et al. |
| 2018/0278521 | A1 | 9/2018 | Pfister et al. |
| 2019/0296999 | A1 | 9/2019 | Dutta |
| 2019/0297000 | A1 | 9/2019 | Dutta |
| 2020/0267011 | A1 | 8/2020 | Peng et al. |
| 2020/0344162 | A1 | 10/2020 | Dutta |

FOREIGN PATENT DOCUMENTS

| | | | | |
|---|---|---|---|---|
| EP | 1443733 A2 * | 8/2004 | ....... | H04L 29/06027 |
| EP | 4030698 A1 | 7/2022 | | |
| WO | WO-2017059708 A1 * | 4/2017 | ............. | H04L 45/04 |
| WO | 2019128621 A1 | 7/2019 | | |
| WO | WO-2021057788 A1 * | 4/2021 | ......... | H04L 12/4633 |

OTHER PUBLICATIONS

R. Aggarwal et al., "BGP Encodings and Procedures for Multicast in MPLS/BGP IP VPNs", Internet Engineering Task Force (IETF), Request for Comments: 6514, Category: Standards Track, ISSN: 2070-1721, https://tools.ietf.org/html/rfc6514, Feb. 2012, 59 pages.

E. Rosen, Ed. et al., Multicast in MPLS/BGP IP VPNs, Internet Engineering Task Force (IETF), Request for Comments: 6513, Category: Standards Track, ISSN: 2070-1721, https://tools.ietf.org/html/rfc6513, Feb. 2012, 88 pages.

Y. Rekhter, Ed. et al., "A Border Gateway Protocol 4 (BGP-4)", Network Working Group, Request for Comments: 4271, Obsoletes: 1771, Category: Standards Track, https://tools.ietf.org/html/rfc4271, Jan. 2006, 104 pages.

Nokia, "11.2 BIER Configuration Command Reference", Multicast Routing Protocols Guide, Release 16.0.R4, https://infocenter.nokia.com/public/7750SR160R4A/index.jsp?topic=%2Fcom.sr.multicast%2Fhtml%2Fbier-cli.html, downloaded Nov. 5, 2020, 3 pages.

* cited by examiner

SUBDOMAIN ↔ ROUTER MAPPING TABLE
500

| SUBDOMAIN \ BFER | 1 | 2 | 3 | 4 | 5 |
|---|---|---|---|---|---|
| 1 | 1 | 1 |   |   |   |
| 2 |   | 1 |   |   |   |
| 3 |   |   |   | 1 | 1 |
| 4 | 1 |   | 1 |   |   |
| 5 |   |   |   | 1 | 1 |
| 6 |   |   | 1 |   |   |
| 7 | 1 | 1 |   |   |   |
| 8 | 1 |   |   |   | 1 |

1 = "PRESENT"

FIG.5A

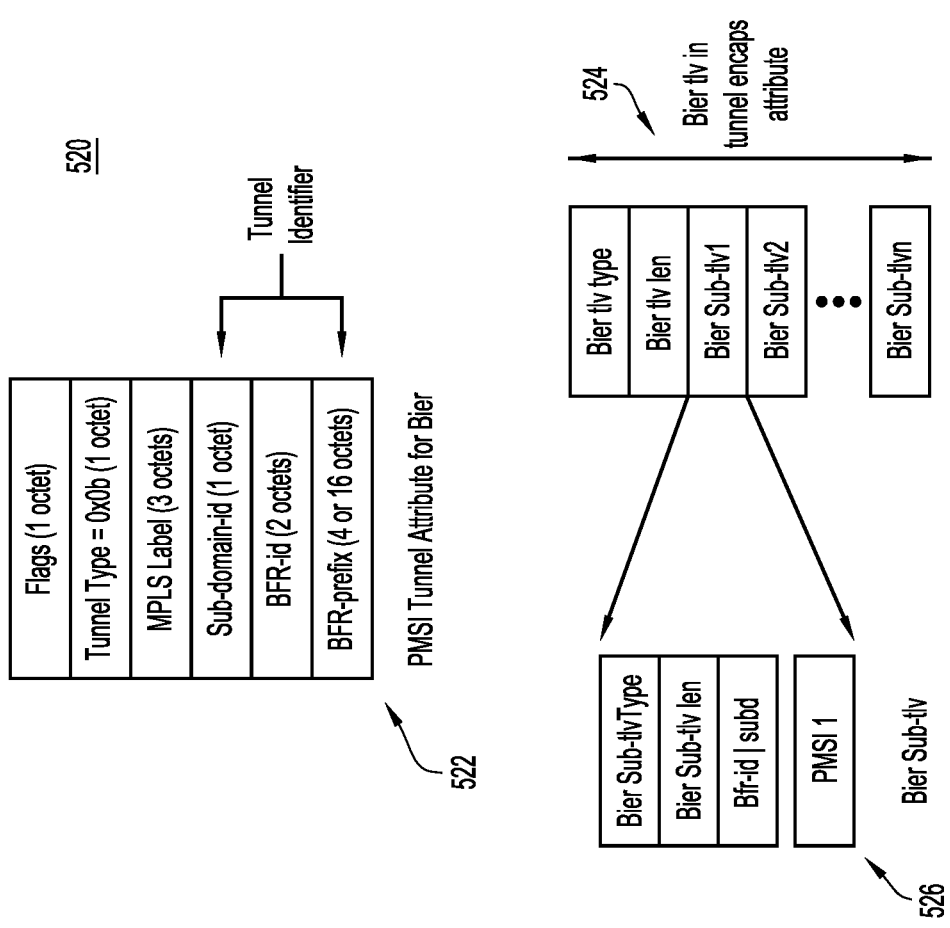

BIER OVERLAY SIGNALING ENHANCEMENT

CROSS-REFERENCE TO RELATED APPLICATIONS

This application is a continuation of U.S. application Ser. No. 17/361,510, filed Jun. 29, 2021, which is a continuation of U.S. application Ser. No. 17/090,579, filed Nov. 5, 2020 (which issued as U.S. Pat. No. 11,102,107), which claims priority to U.S. Provisional Application No. 63/090,517, filed Oct. 12, 2020, each of which is incorporated by reference herein in its entirety.

TECHNICAL FIELD

The present disclosure relates generally to network signaling and, more specifically, to Bit Index Explicit Replication (BIER) overlay signaling.

BACKGROUND

The BIER Request for Comments (RFC) 8556 for Multicast (m) Virtual Private Network (VPN) (mVPN) using BIER defines procedures to perform VPN signaling over a BIER core. The RFC was written before actual implementation of the procedures. The BIER procedures do not build an explicit tree to deliver multicast traffic over the BIER core, and BIER is not the same as existing peer to multicast peer (P2MP) technologies. BIER mVPN procedures inherit all procedures from RFC 6514/RFC 6513, which were originally developed to handle Peer-to-Multicast Peer (P2MP) tree building mechanisms. The existing BIER procedures present various shortcomings and disadvantages.

BRIEF DESCRIPTION OF THE DRAWINGS

FIG. 5A shows a table that maps subdomains to Bit-Forwarding Routers (BFRs) for a BIER network, according to an embodiment.

FIG. 5B shows a message structure configured to carry multiple Provider Multicast Service Interface (PMSI) Tunnel Attributes (PTAs), according to an embodiment.

DESCRIPTION OF EXAMPLE EMBODIMENTS

Overview

A method comprises, at a first router configured to perform BIER for forwarding of multicast packets in a network, storing configuration information that indicates that the first router belongs to multiple subdomains of a BIER domain, and is able to forward the multicast packets for a virtual private network on the multiple subdomains. The method further comprises, during an auto-discovery procedure, generating an auto-discovery message to include an auto-discovery route and route attributes that indicate the multiple subdomains, and sending the auto-discovery message to a second router of the virtual private network.

Example Embodiments

Embodiments presented herein represent an umbrella of major enhancements over the existing mVPN procedures for BIER mVPN signaling. The embodiments address shortcomings of, and problems associated with, the existing mVPN procedures. The shortcomings and problems are described first in connection with FIGS. 1 and 2. Then, the embodiments or enhancements are described in connection with FIGS. 3-6.

Figure 1:
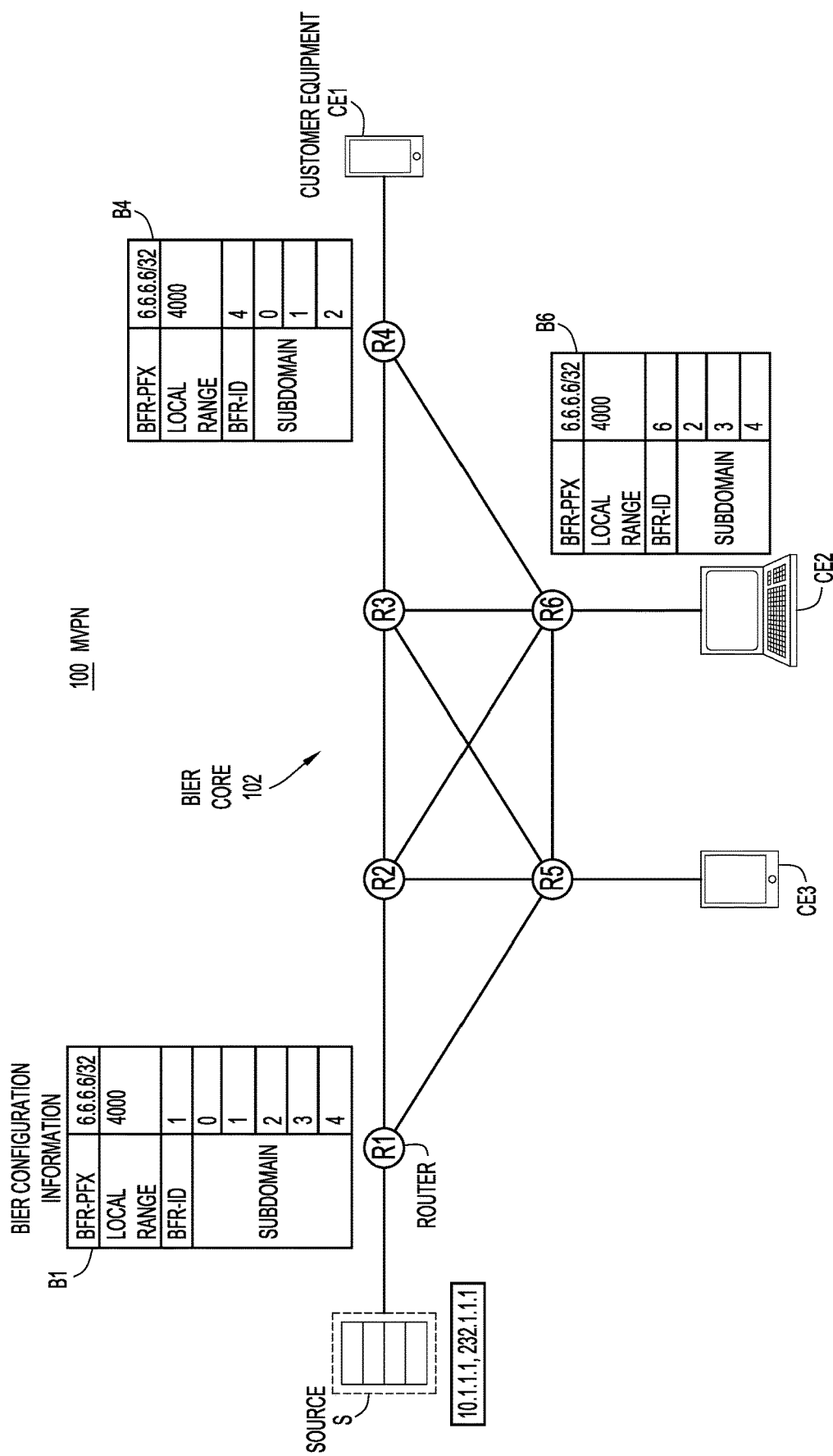
FIG. 1 is a block diagram of a network that includes a BIER core in which embodiments may be implemented.

Referring first to FIG. 1, there is a block diagram of an example mVPN 100 that includes a BIER core 102. BIER core 102 implements BIER procedures to forward multicast traffic (e.g., IP packets). BIER core 102 includes routers R1-R6 connected to each other over various network links, as shown. More generally, routers R1-R6 represent network devices, such as routers, switches, and the like, that may be implemented in hardware or virtually, e.g., as network device applications hosted on servers. Routers R1-R6 may each be referred to as an "mVPN router." Network 100 also includes a source S of multicast traffic connected to router R1, and customer equipment CE1, CE2, and CE3 (or multicast receivers CE1-CE3 of multicast traffic) connected to routers R4, R6, and R5, respectively. Routers R1 and R4-R6 are also referred to as "edge" routers because they sit at the edge of BIER core 102 and connect to the external equipment (e.g., source S and receivers CEi) as shown. Generally, source S originates multicast traffic or flows of multicast IP packets destined for receivers CE1-CE3 and sends the multicast traffic to router R1. R1 acts as a source or ingress router for BIER core 102 (and the mVPN) that forwards the multicast traffic to routers R4-R6, which act as egress routers for the BIER core (and the mVPN) to forward the multicast traffic to respective receivers CE1-CE3.

Routers R1-R6 are each configured or provisioned with information associated with BIER procedures. For example, routers R1, R4, and R6 are configured with respective BIER-related information B1, B4, and B6. In each case, the information includes, for a router:
1. A Bit-Forwarding Router (BFR)-Prefix (PFX) (BFR-PFX), which identifies the router in network 100.
2. A Local Range that is allocated to the router so that the router can perform forwarding of traffic using BIER over Multiprotocol Label Switching (MPLS), for example. For BIER over MPLS, the router uses a label to send traffic to a next hop. A label in the Local Range will be assigned to traffic that belongs to the BFR-PFX.
3. A unique BFR-Identifier (ID) (BFR-ID) is assigned to the router.
4. A BIER subdomain list that identifies BIER subdomains of a BIER domain on which the router can send and receive traffic. Each subdomain is identified by a respective subdomain identifier. A BIER domain supports up to 255 subdomains. Subdomain 0 is a default subdomain. A BIER domain include an Internet Gateway Protocol (IGP) area, and subdomains represent different topologies within that area. In the example of FIG. 1, R4 is configured with subdomains 0-2, while R6 is configured with subdomains 2-4.

Various problems associated with the existing BIER procedures are now described in connection with FIGS. 1 and 2.

Prior to routing of multicast traffic through BIER core 102, routers R1-R6 of the BIER core perform BGP auto-discovery (A-D) among themselves. During BGP auto-discovery, routers R4-R6 send to source/ingress router R1 respective BGP messages that carry respective Inclusive (I)-PMSI (I-PMSI) information (e.g., respective routes) for the sending routers R4-R6 (i.e., the "sending" here means originating and sending of BGP messages). Per RFC constraints, the I-PMSI information sent by each router carries/indicates only one subdomain configured on that router, even when the router is configured with multiple subdomains. Therefore, when using existing auto-discovery procedures for BIER, source router R1 does not learn all of the subdomains configured on all of edge routers R4-R6 for a given VPN routing and forwarding (VRF) instance, i.e., for a given mVPN.

Figure 2:
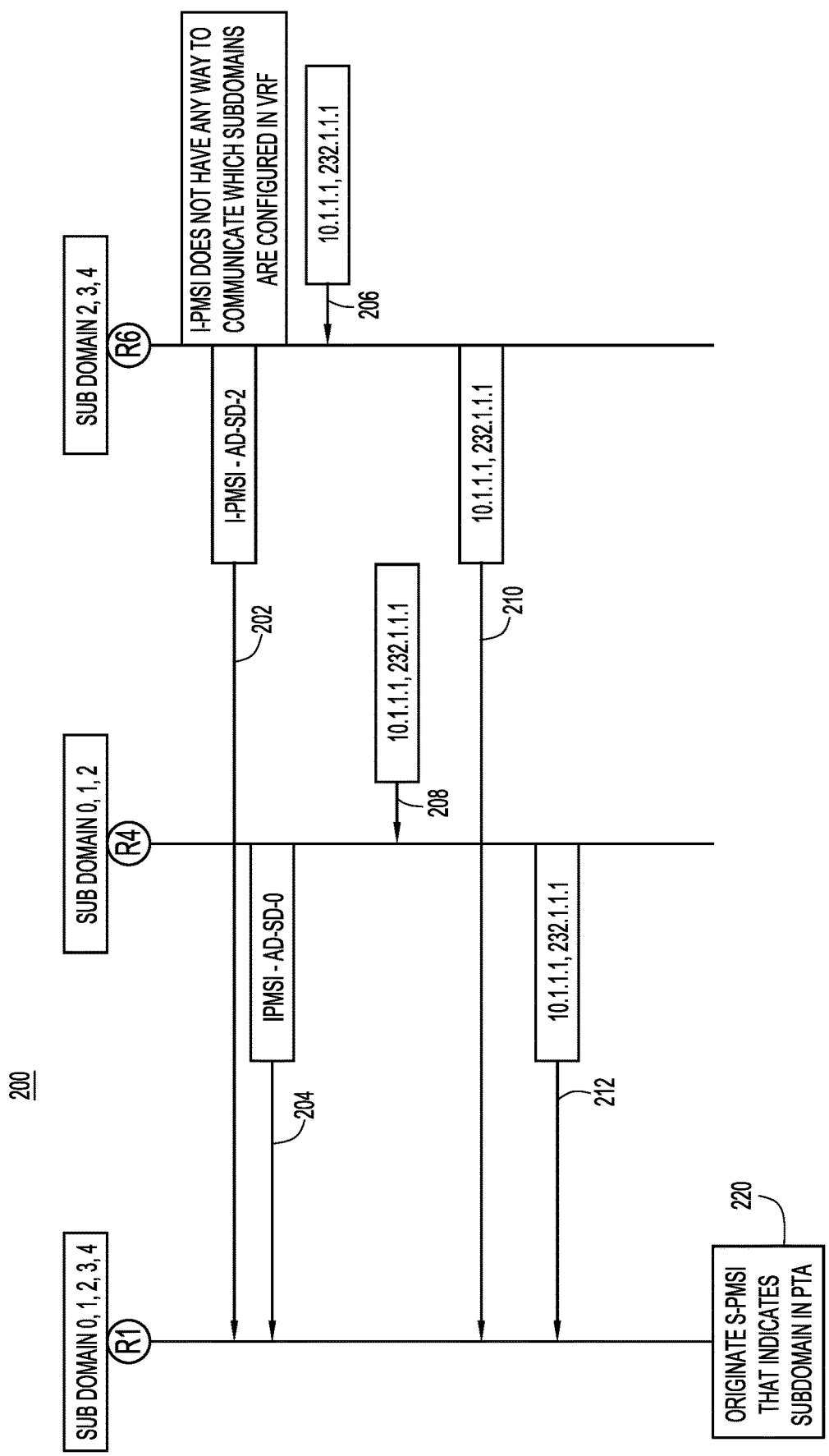
FIG. 2 is a transaction diagram of auto-discovery signaling in the BIER core using existing Border Gate Protocol (BGP) auto-discovery procedures.

With reference to FIG. 2, there is a transaction diagram of auto-discovery signaling 200 in BIER core 102 using existing auto-discovery procedures. Using existing auto-discovery procedures 200, routers R6 and R4 send, to source router R1, respective BGP updates 202 and 204 that carry respective I-PMSI information (simply "I-PMSI"). The respective I-PMSI sent by each of routers R6 and R4 only indicates one subdomain (SD). For example, the I-PMSI from router R6 only indicates only SD-2, while the I-PMSI from router R4 only indicates SD-0.

After sending their BGP updates, routers R6 and R4 receive from their connected customer equipment respective joins (e.g., local Internet Group Management Protocol (IGMP) membership joins) 206 and 208, and forward their respective joins to router R1 at 210 and 212. Each membership join includes a pair (source address (s), group address (g)). In response, under existing BIER procedures, at 220, router R1 should originate a Supervisor (S)-PMSI (route) that indicates which subdomains pertain to multicast traffic; however, because router R1 does not have a complete view of all of the subdomains configured on R4 and R6 due to the limitations of the existing auto-discovery, router R1 does not have a clear view about which subdomains should be used/indicated in the subsequent S-PMSI originated by router R1. For example, if router R1 originates an S-PMSI with SD-0, only router R4 receives the traffic; if router R1 originates an S-PMSI with SD-2, only router R6 receives the traffic.

Problem 2

Under existing BIER procedures, there is no way for an edge router that is a receiver of multicast traffic (e.g., routers R4-R6) to indicated to a source router (e.g., router R1) a preferred subdomain on which the edge router would like to receive multicast traffic. For example, when the edge router that is the receiver sends a membership join (s, g) to the source router, there is no way for the edge router (receiver) to indicate, along with the membership join, on which preferred subdomain the edge router (receiver) would like to receive multicast traffic identified in the join (i.e., the (s, g) traffic).

Problem 3

Depending on network design, it is desirable to use more than one subdomain to serve a multicast network, i.e., it is undesirable to be limited only to one subdomain, as is the case with existing procedures. Thus, there is a need to be able to originate an S-PMSI (e.g., at source router R1) with multiple PMSI Tunnel Attributes (PTAs), instead of just one PTA, and to allow an edge router (receiver) join one or more subdomains depending on local configuration at the edge router.

Problem 4

Using existing procedures, traffic flow-to-subdomain mapping may be performed using a default domain, or on a per-(s, g) basis. As for unicast in a BIER domain, it is desirable to have per-flow mapping to subdomains of the BIER domain, using differentiated services code point (DSCP) for Quality-of-Service (QoS) in an IP header of an IP packet, for example. This is not supported by the existing procedures.

Embodiments

The following embodiments overcome the problems described above and provide numerous advantages:
1. Encoding all subdomains configured on a router under a given VRF to each BGP speaker.
2. Encoding a preferred subdomain as part of an overlay membership join.
3. Originating S-PMSI with multiple PTAs via a new signaling mechanism.
4. Encoding subdomain characteristics with overlay signaling.

The embodiments are described below in connection with FIGS. 3A-6.

Figure 3A:
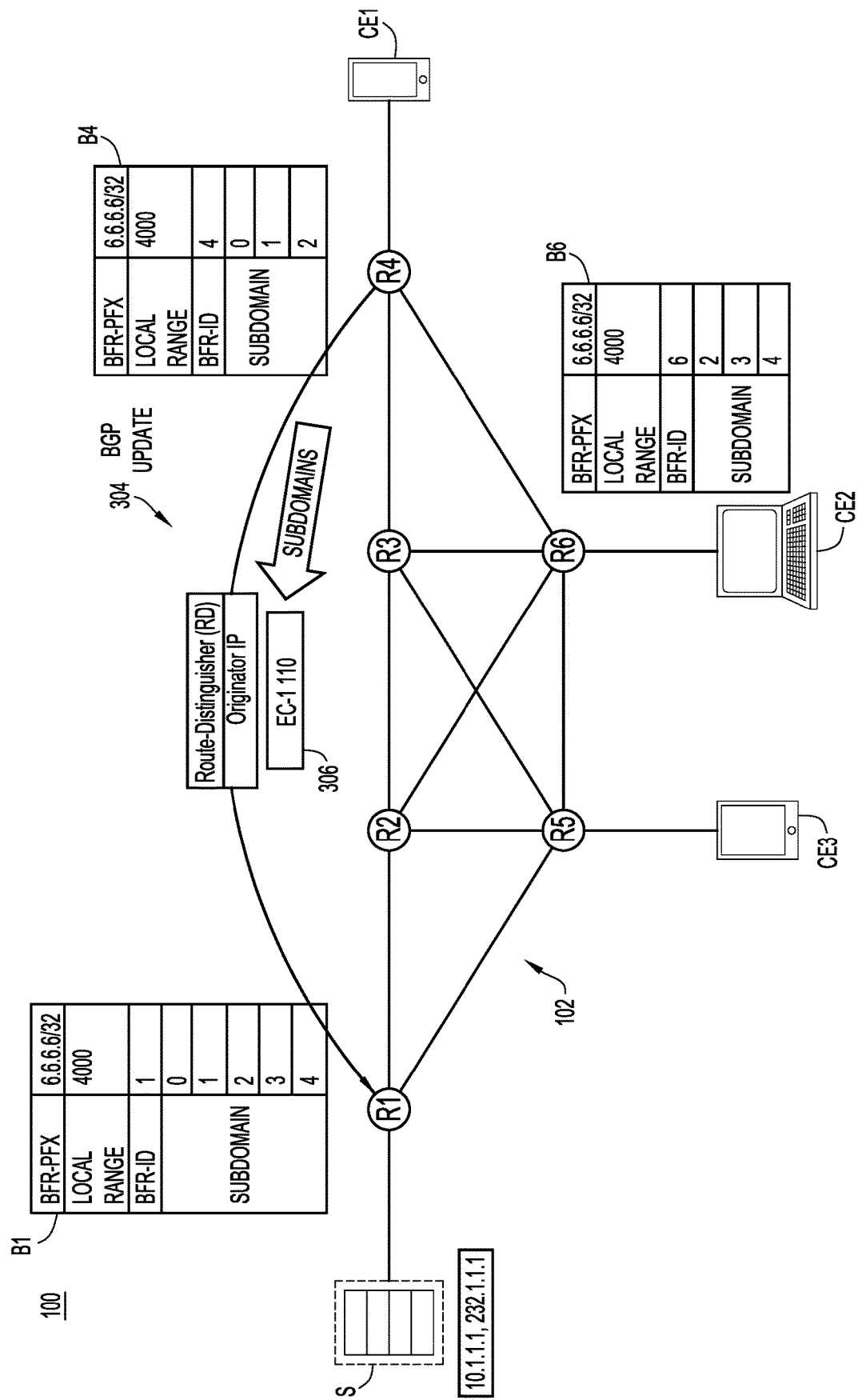
FIG. 3A is an illustration of a BIER core in which existing BIER procedures are extended to include encoding of all subdomains configured on a router under a given VPN Routing and Forwarding (VRF) instance to each BGP speaker, according to an embodiment.

Encoding All Subdomains Configured on a Router Under a Given VRF to Each BGP Speaker With reference to FIG. 3A, there is an illustration of network 100 modified to extend the BIER procedures to include encoding of all subdomains configured on a given router under a given VRF to each BGP speaker. In the example of FIG. 3A, routers R4-R6 (receivers) each (i) encodes into a respective bitmap its respective multiple subdomains for a given VRF, includes the bitmap in a new extended community (EC) of a BGP update, and sends the BGP update with the new EC to source router R1. That is, while originating I-PMSI along with I-PMSI attributes, each of edge routers R4-R6 sends a bitmap as part of a route attribute including the EC, which notifies source router R1 that the originating router (e.g., R4, R5, or R6) is participating in multiple subdomains in I-PMSI routes. Because the entire network has a maximum of 256 subdomains, the bitmap may be spread across 256 extended communities (ECs), i.e., using different ECs. Alternatively, one EC may carry a bitmap that encodes all of the subdomains. In the example of FIG. 3A, edge router R4 sends BGP update 304 with EC 306 encoded with identifiers of subdomains 0-2 configured on edge router R4.

In this embodiment, processing at the originator router (i.e., the sender of the BGP update) includes:
1. While originating the I-PMSI for the BIER core, adding the bitmap to the new EC(s) that indicate(s) all subdomains configured on the originator router.
2. In addition to (1), also sending the PMSI Tunnel Attribute (PTA) with only the subdomain that is configured as part of a default subdomain, as is done in the existing procedures.

Processing at the receiver router (i.e., receiver of the BGP update, router R1) includes:
1. Receiving the default subdomain in the PTA from the originator router.
2. Receiving the full set of subdomains configured on the originator router.
3. Keeping track of all of the subdomains configured on all of the originator routers as conveyed in the new ECs sent by the originate routers, e.g., constructing mappings of the originator routers to the subdomains configured on the originator routers.

Figure 3B:
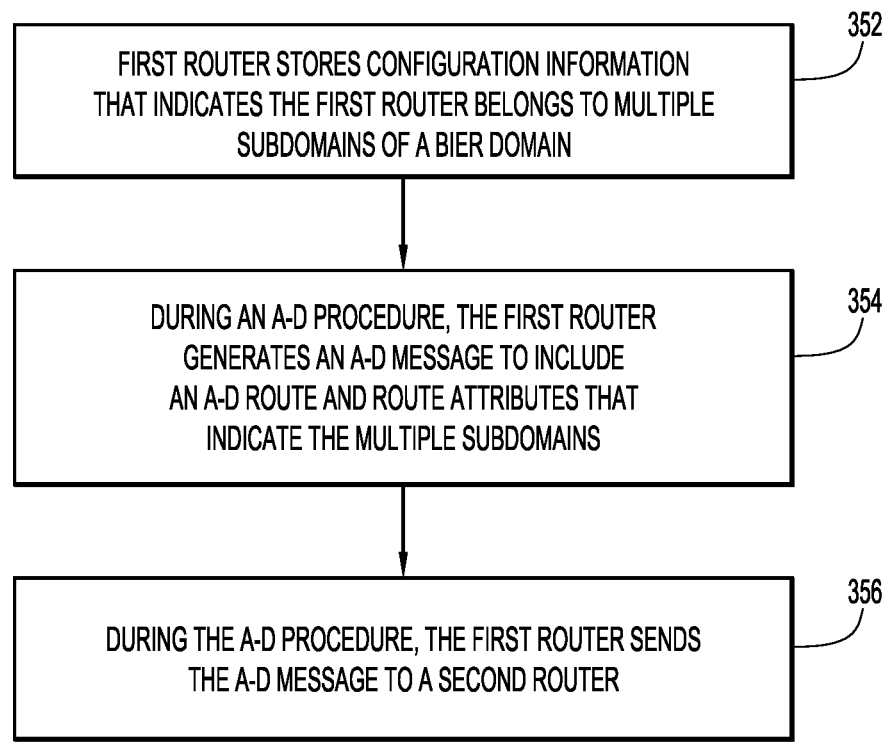
FIG. 3B is a flowchart of a method of encoding of all subdomains configured on a router configured to perform BIER procedures for forwarding of multicast traffic/packets for a VRF in a network, according to an embodiment.

With reference to FIG. 3B, there is a flowchart of an example method 350 of performing a BIER procedure for forwarding of multicast traffic/packets for a VRF in a network (e.g., a BIER core). The BIER procedure relies on an extension of auto-discovery that permits routers configured with multiple subdomains to communicate that information to other routers.

At 352, a first router (e.g., an mVPN egress router, such as router R4) stores BIER configuration information that indicates that the first router belongs to multiple subdomains of a BIER domain, and enables the first router to forward the multicast packets for a VPN on the multiple subdomains. The BIER configuration information may include multiple subdomain identifiers for corresponding ones of the multiple subdomains.

During an auto-discovery procedure, the first router performs next operations 354 and 356.

At 354, the first router generates an auto-discovery message (e.g., a single auto-discovery message) to include an auto-discovery route and route attributes that indicate the multiple subdomains. The first router encodes the multiple subdomain identifiers into the route attributes. In an example, the auto-discovery message may include a BGP update message that includes (i) an I-PMSI route as the auto-discovery route, and (ii) the multiple subdomain identifiers encoded into one or more ECs. The route attributes may further include a PTA that indicates a default subdomain.

At 356, the first router sends the auto-discovery message to a second router (e.g., an mVPN ingress/source router, such as router R1) of the network.

Encoding a Preferred Subdomain as Part of an Overlay Membership Join

Figure 4A:
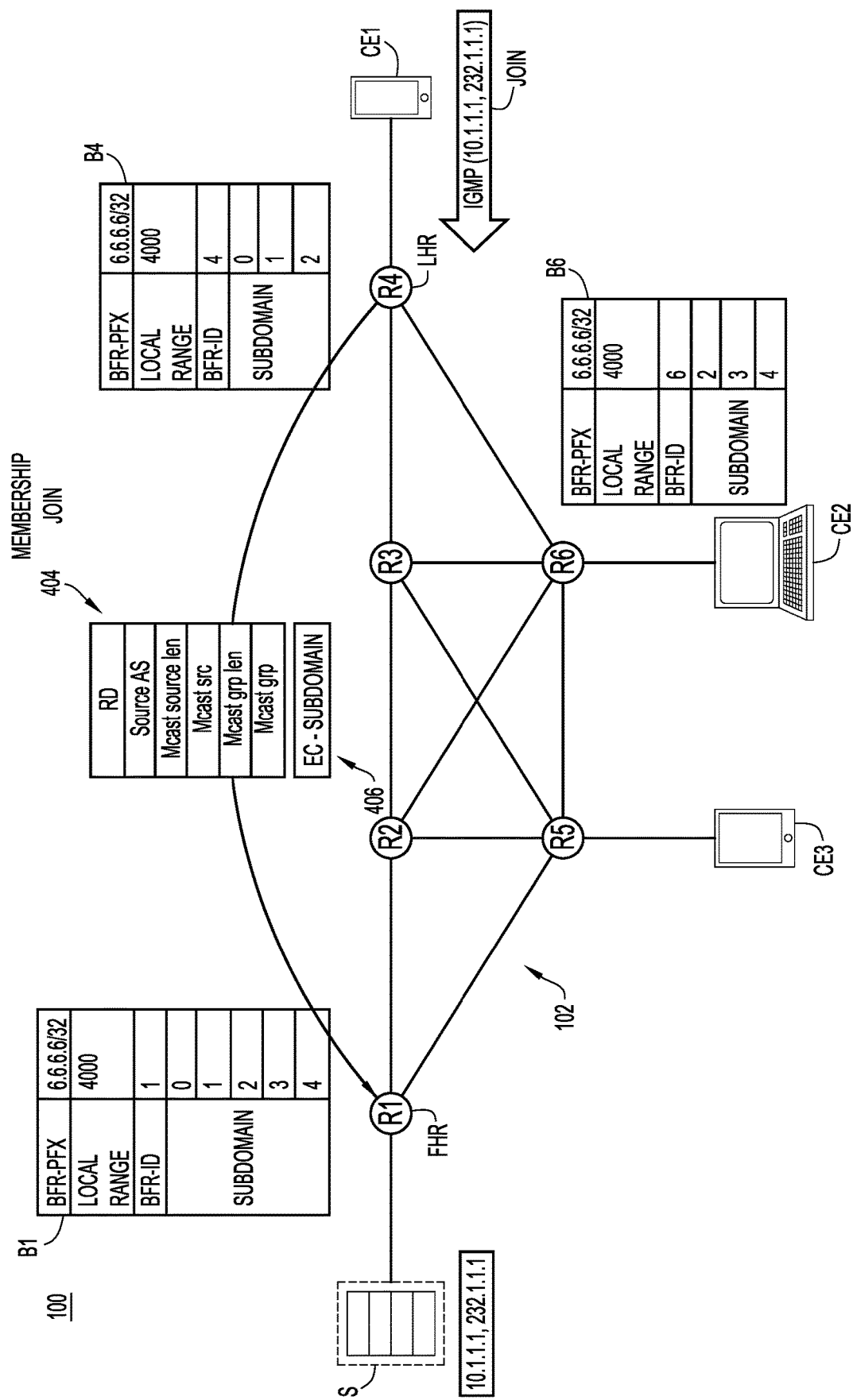
FIG. 4A is an illustration of a BIER network in which existing BIER procedures are extended to include encoding of a preferred subdomain as part of an overlay membership join, according to an embodiment.

With reference to FIG. 4A, there is an illustration of network 100 modified to extend the BIER procedures to include encoding of a preferred subdomain as part of an overlay membership join. This includes a method of encoding subdomain characteristics with overlay signaling. As shown in FIG. 4A, when a last hop router (LHR) (e.g., router R4) receives a membership join (e.g., an IGMP membership join), the LHR originates an overlay multicast membership join 404 toward source router R1, which is the first hop router (FHR). The LHR (i.e., the originating router) adds to membership join 404 a new EC 406 that includes an identifier of a preferred subdomain on which the last hop router prefers to receive traffic. As shown, multicast membership join 404 includes a route distinguisher (RD), a source autonomous system (AS) identifier, a multicast (M) (MCAST) source address, an MCAST group length, and an MCAST group (grp) address.

In this embodiment, processing at the LHR includes (i) checking a local multicast traffic/packet forwarding policy configured on the LHR for a direction/signal to take action to assert a preferred subdomain and, if the direction exists, selecting a preferred subdomain among one or more subdomains configured on the FHR, and (ii) adding, to the overlay join, the new EC that identifies the preferred subdomain.

Processing at the FHR (e.g., source router R1) includes receiving the membership join. Subsequently, while originating S-PMSI, the FHR makes a decision on whether to honor the preference request from the LHR, based on a local traffic forwarding policy configured on the FHR. It is not necessary for the FHR to honor the preference request, which is a locally implemented decision.

Because the overlay join is suppressed at any router reflector (RR) (not shown in the figures) in the network, processing at the RR includes sending an update on the attribute.

Figure 4B:
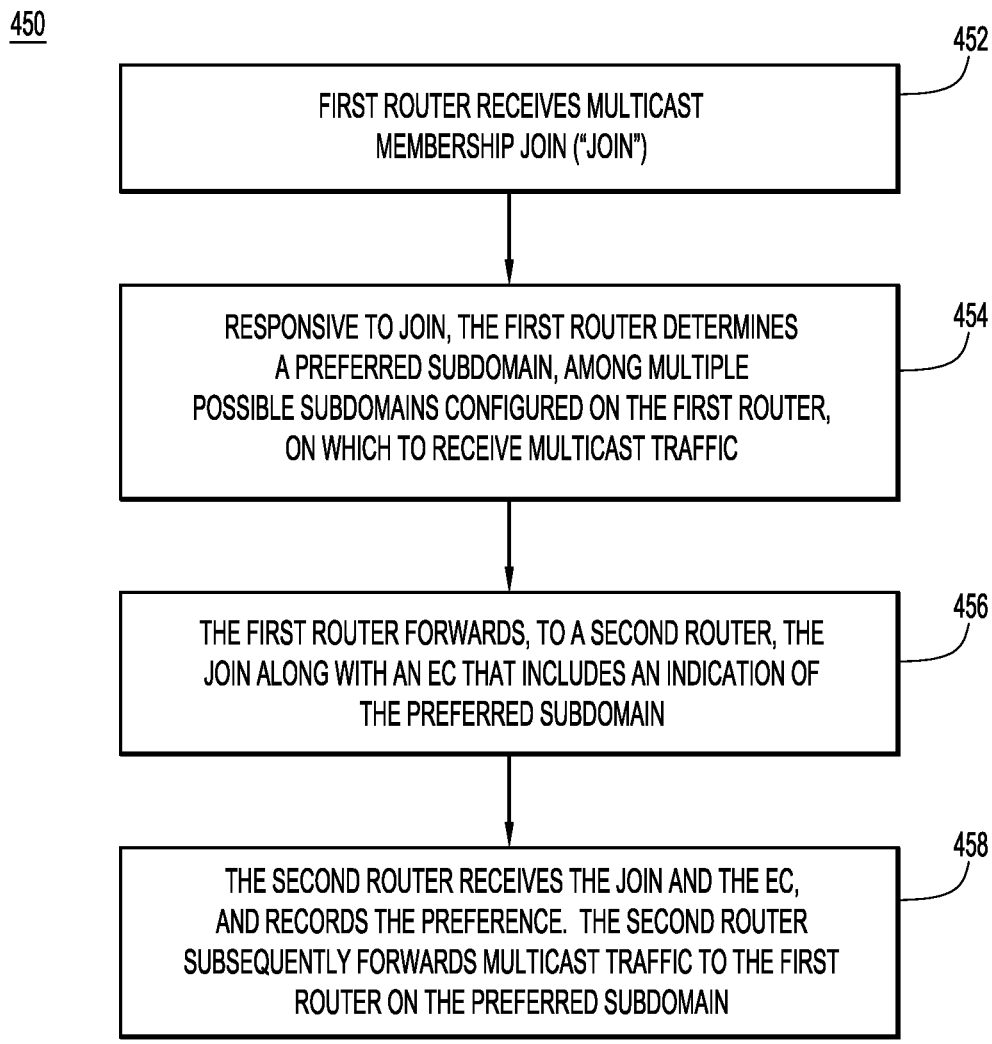
FIG. 4B is a flowchart of a method of performing BIER procedures for forwarding of multicast traffic/packets for a VRF, including encoding of a preferred subdomain with a membership join, according to an embodiment.

With reference to FIG. 4B, there is a flowchart of an example method 450 of performing a BIER procedure for forwarding of multicast traffic/packets for a VRF on a preferred subdomain. The BIER procedure includes forwarding, by a router, an indication of a preferred subdomain on which to receive the multicast traffic/packets.

At 452, a first router (e.g., an mVPN egress router, such as router R4) receives a multicast membership join (e.g., an (s, g) join) from customer equipment.

At 454, responsive to receiving the multicast membership join, the first router determines whether a local multicast packet forwarding policy configured on the first router directs the first router to assert a preferred subdomain, among multiple subdomains configured on the first router, on which to receive multicast traffic indicated in the join. If the first router is directed to assert the preferred subdomain, the first router selects the preferred subdomain. Otherwise, the first router will not assert any preferred subdomain.

At 456, the first router forwards, to a second router (e.g., an mVPN ingress/source router, such as router R1) in the network, the multicast membership join along with the indication of the preferred subdomain (e.g., a subdomain identifier). The indication may be carried/included in a new EC accompanying the join. The new EC may include a subdomain identifier of the preferred subdomain, along with a flag set to indicate that the EC includes the preferred subdomain identifier.

At 458, the second router (e.g., router R1) receives the join and the accompanying EC, and records the preference. Subsequently, when the second router receives multicast traffic that matches that expressed in the multicast membership join, the second router forwards the multicast traffic on the preferred subdomain to the first router, based on the recorded preference.

Originating S-PMSI with Multiple PTAs Via a New Signaling Mechanism

When a receiver router (e.g., in this case, source router R1) receives from originator routers (e.g., routers R4-R6) the new BGP updates described above that collectively convey all of the subdomains configured on all of the originator routers, the receiver router keeps track of all per-router neighbor configured subdomains. The receiver router (e.g., source router R1) examines the per-router configured subdomains to determine a minimum set of subdomains that cover all of the subdomains, and then sends S-PMSI (routes) to the minimum set of subdomains, thus covering all of the subdomains with minimum overhead traffic. For example, from all of the BGP updates received from the originator routers that sent the BGP updates, the receiver router constructs a subdomain vs. BFR table that maps the subdomains to the various originator routers, and uses the table to determine the minimum set of subdomains.

With reference to FIG. 5A, there is shown an example table 500 that maps subdomain (the columns) vs. bit-forwarding egress router BFER (the rows) and that is constructed by source router R1 based on BGP updates carrying ECs as described above in connection with FIGS. 3A and 3B. The table shows a BIER configuration in which subdomains 1-8 are distributed across five routers R1-R5. The rows of the table represent the routers and the columns indicate the presence or absence of a subdomain configured on the corresponding router. In the table, a "1" represents the presence of a subdomain, while a blank represents the absence of the subdomain. The configuration indicated in the table indicates there is no single subdomain that serves all of the routers for a given multicast flow. To solve this, the capability of the source router R1 is extended to be able to send an S-PMSI with multiple PTAs.

One way to accommodate multiple PTAs is to introduce a new Tunnel Encaps sub-tlv for BGP, for example. The solution cannot simply send multiple PTAs in a BGP update because more than one attribute of the same type is not allowed in the BGP update per existing RFC 4271, which states: "[t]he same attribute (attribute with the same type) cannot appear more than once within the Path Attributes field of a particular update message." Therefore, embodiments presented herein carry each PTA as a sub-tlv in the tunnel encaps attribute. The following two approaches may be employed.

1. Send one PMSI attribute, e.g., PTA1, corresponding to one subdomain. Then, the remaining PMSIs can be encapsulated as BIER-type sub-tlvs in the tunnel encaps attribute. An Internet Assigned Numbers Authority (IANA) allocation should be made for this sub-tlv. Also, a flag should be reserved in the PMSI attribute to indicate the follow-on subdomain identifiers.
2. Encode all of the PTAs corresponding to respective subdomains in tunnel-encaps sub-tlvs. This will, however, require a note in the standards that the X-AD routes need not carry a PTA.

With reference to FIG. 5B, there is an illustration of an example message structure 520 for BGP configured to carry multiple PTAs, as described above. Message structure 520 includes a PMSI tunnel attribute for BIER 522 and its accompanying (new) BIER tlv in tunnel encaps attribute 524. The Flag field of PMSI tunnel attribute for BIER 522 includes a flag that is set to indicate that there are other sub-domains and BFR-IDs in accompanying tunnel encaps attribute 524. New BIER sub-tlv tunnel encaps attribute 524 encodes each additional PMSI, except one, as a BIER sub-tlv 526 inside the sub-tlv tunnel encaps attribute.

Figure 5C:
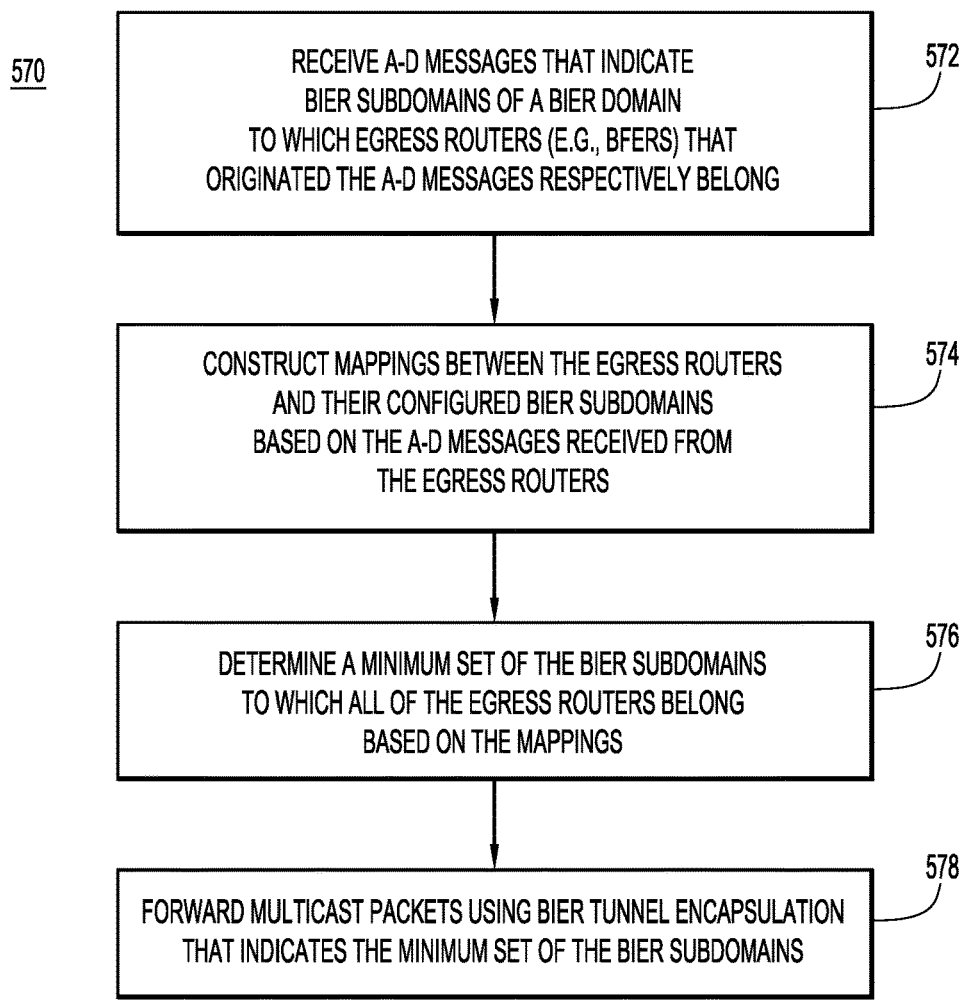
FIG. 5C is a flowchart of a method of performing BIER procedures for forwarding of multicast traffic/packets for a VRF on a minimum set of subdomains, according to an embodiment.

With reference to FIG. 5C, there is a flowchart of an example method 570 of performing BIER procedures for forwarding of multicast traffic/packets for a VRF on a minimum set of subdomains.

At 572, an ingress router (e.g., router R1) receives auto-discovery messages that indicate BIER subdomains of a BIER domain of the network to which egress routers (e.g., BFERs) that originated the auto-discovery messages respectively belong.

At 574, the ingress router constructs mappings between the egress routers and the BIER subdomains to which the egress routers respectively belong based on the auto-discovery messages. For example, the ingress router constructs mappings in the form of the table of FIG. 5A, although other mapping structures are possible.

At 576, the ingress router determines a minimum set of the BIER subdomains to which all of the egress routers belong based on the mappings. For example, referring again to FIG. 5A, the ingress router may determine subdomains 5, 6, and 7 as a minimum set of subdomains, because a flow forwarded on each of subdomains 5, 6, and 7 reaches all of the routers.

Returning to FIG. 5C, at 578, the ingress router forwards multicast packets limited to the minimum set of the BIER subdomains to all of the egress routers.

Figure 5D:
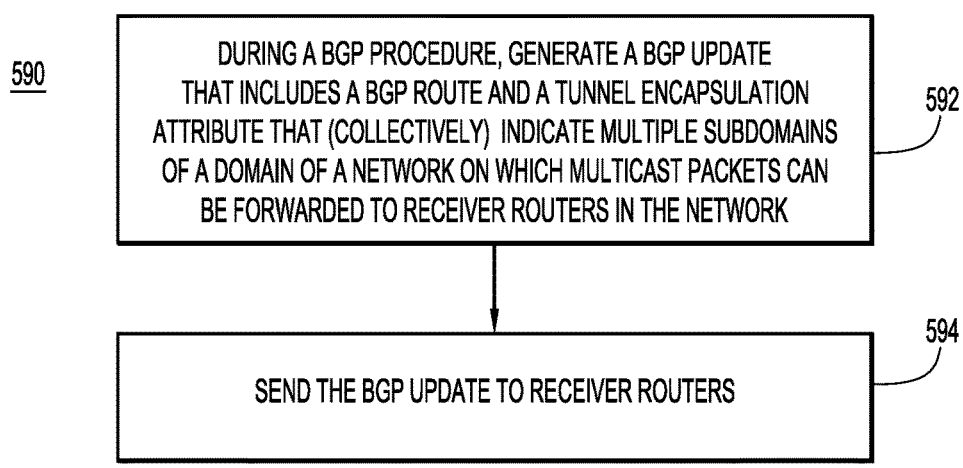
FIG. 5D is a flowchart of a method of performing BIER procedures for forwarding of multicast traffic/packets for a VRF, which indicates multiple subdomains, according to an embodiment.

With reference to FIG. 5D, there is a flowchart of an example method 590 of performing BIER procedures for forwarding of multicast traffic/packets for a VRF in a network using tunnel encapsulation that indicates multiple subdomains.

At 590, during a BGP procedure, a source router (e.g., router R4) generates a BGP update that includes a BGP route and a tunnel encapsulation attribute, such that the tunnel encapsulation attribute indicates multiple subdomains of a BIER domain of the network on which multicast packets can be forwarded, by the source router, to receiver routers in the network. The BGP update may include an I-PMSI route as the BGP route, and the tunnel encapsulation attribute may include multiple PTAs corresponding to respective ones of the multiple subdomains, as shown in FIG. 5B. The tunnel encapsulation attribute may include a TLV element, and the TLV element may include sub-TLVs. The source router may encode at least some of the multiple PTAs in corresponding ones of the sub-TLVs. The source router may also encode one of the multiple PTAs, but excluding the at least some of the multiple PTAs, in a PMSI attribute.

At 592, the source router sends the BGP update to the receiver routers.

Encoding Subdomain Characteristics with Overlay Signaling

In BIER core 102, source router R1 may receive many traffic flows of IP packets to be forwarded to routers R4-R6. It is desirable to enhance the capability of router R1 to assign the flows to different subdomains based on or under different criteria. In an embodiment, router R1 assigns flows to subdomains based on a value of a field (e.g., a DSCP field) of an IP header of each of the IP packets of the flows. For example, router R1 maintains different mappings of DSCP values-to-subdomain IDs. For example, DSCP value 0 maps to subdomain 0, DSCP value 1 maps to subdomain 1, and so on. Then, upon receiving flows of IP packets, source router R1 assigns the IP packets in the flows to subdomains based on the mappings, i.e., based on the DSCP values in the IP headers of the IP packets and the subdomains to which the DSCP values are mapped. This is a convenient and efficient way to group multiple flows to a single subdomain.

Figure 6:
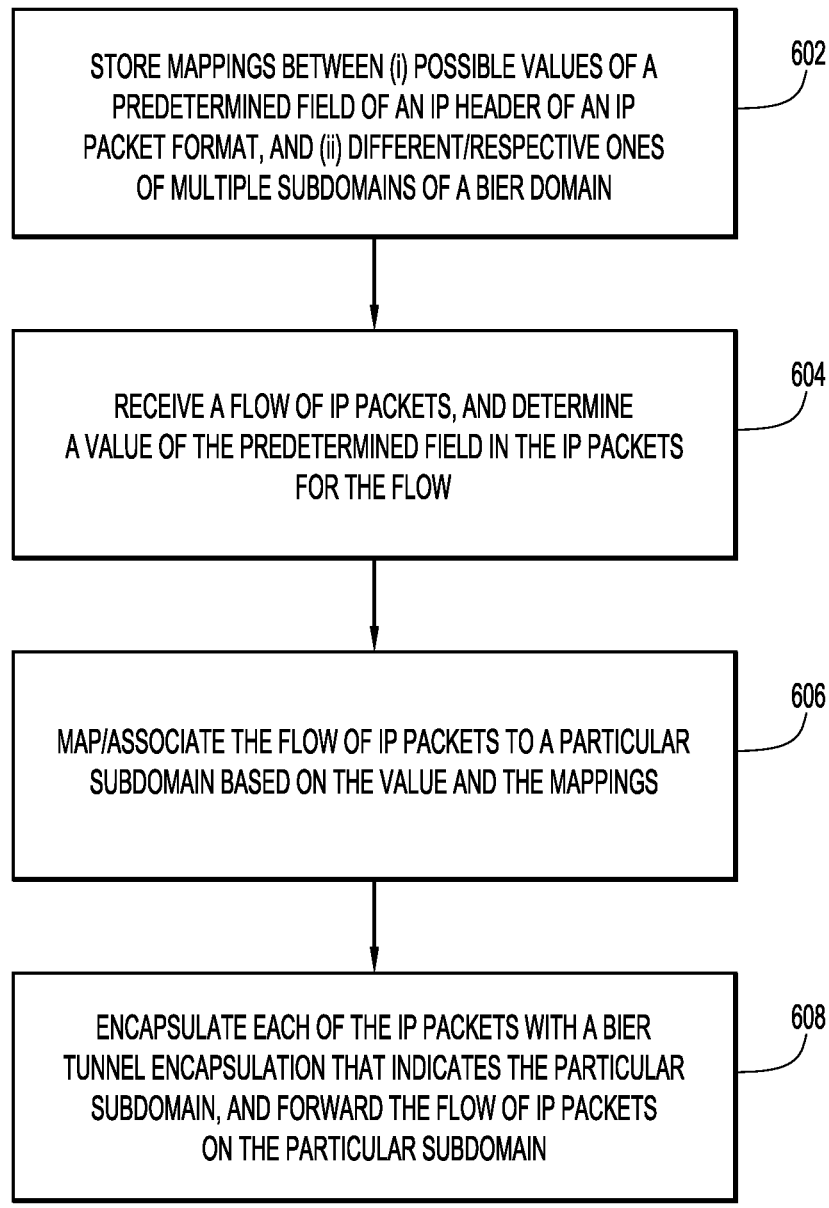
FIG. 6 is a flowchart of a method of performing BIER procedures for forwarding of multicast Internet Protocol (IP) packets for a VRF on a subdomain selected based on a value in the IP packets, according to an embodiment.

With reference to FIG. 6, there is a flowchart of an example method 600 of performing BIER procedures for forwarding of multicast traffic/IP packets for a VRF on subdomains selected based on values in an IP header of the IP packets.

At 602, an ingress router, configured to perform BIER forwarding of multicast Internet Protocol (IP) packets in a network, stores mappings between (i) possible values of a predetermined field of an IP header of an IP packet format, and (ii) different/respective ones of multiple subdomains of a BIER domain. For example, the ingress router stores mappings between possible values of a QoS/DSCP field of the IP header and the respective ones of the different subdomains.

At 604, the ingress router receives a flow of IP packets from a source, and determines a value of the predetermined field in the IP packets. For example, the ingress router parses the IP headers of the IP packets to access the value. The flow may be identified, for example, based on a tuple that include source and destination IP addresses, port addresses, and the like.

At 606, the ingress router maps/associates the flow of IP packets to/with a particular subdomain among the different subdomains based on the value and the mappings.

At 608, the ingress router encapsulates each of the IP packets with a BIER tunnel encapsulation that indicates the particular subdomain, and forwards the flow of IP packets on the particular subdomain of the network.

Figure 7:
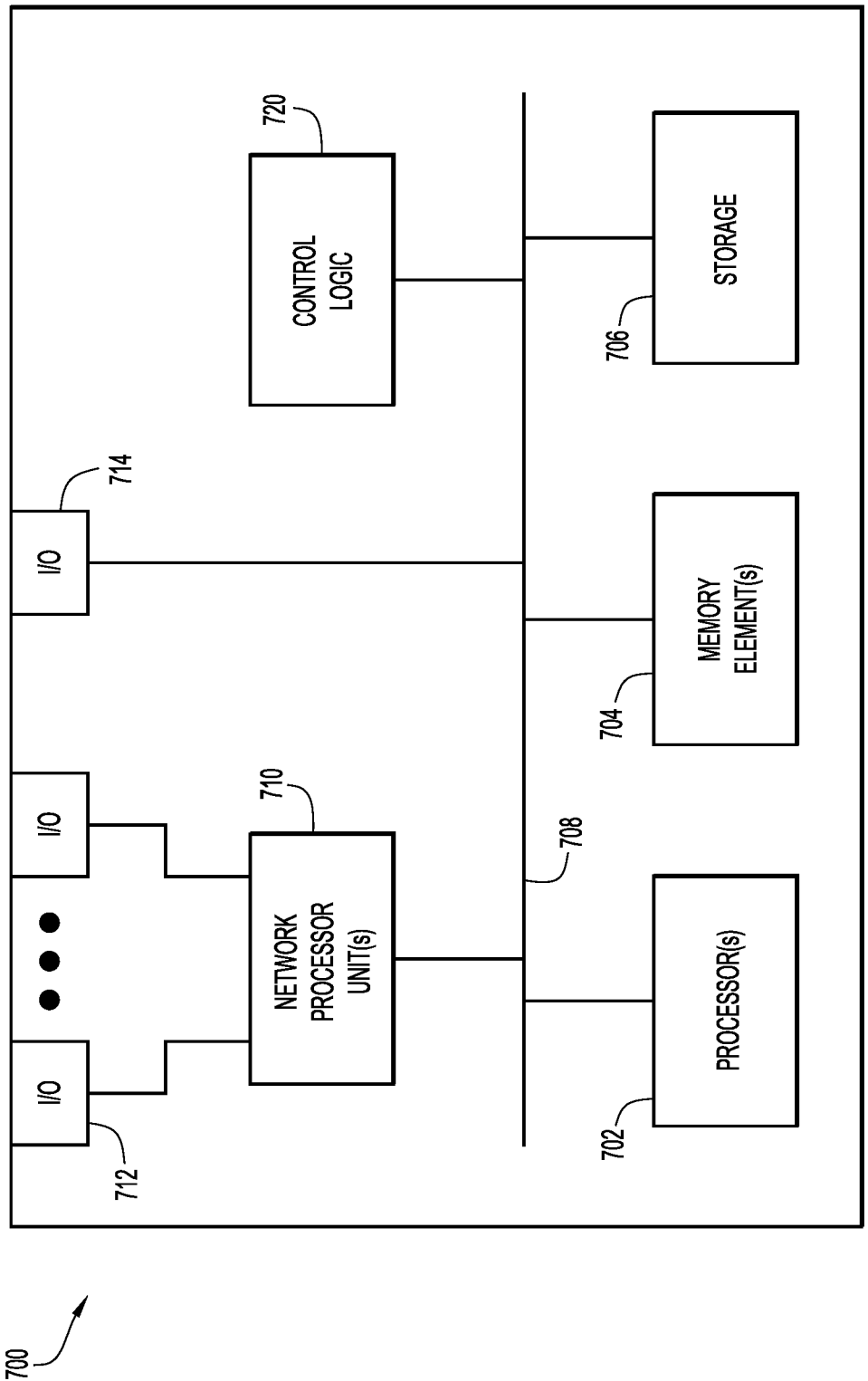
FIG. 7 is a block diagram of a network device, representative of a BIER router in the BIER core, according to an embodiment.

Referring to FIG. 7, FIG. 7 illustrates a hardware block diagram of a computing device 700 that may perform functions associated with operations discussed herein in connection with the techniques depicted in FIGS. 1-6. In various embodiments, a computing device, such as computing device 700 or any combination of computing devices 700, may be configured as any entity/entities as discussed for the techniques depicted in connection with FIGS. 1-6 in order to perform operations of the various techniques discussed herein. For example, computing device 700 may operate as a network device representative of each of routers R1-R6 that perform BIER procedures, described above.

In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computer device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 7 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 7) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the embodiments presented herein provide a framework for enhanced BIER overlay signaling that:
1. Adds the capability to notify a source router of all configured subdomains in a given VRF.
2. Provides the framework to support multiple subdomains in the same VRF.
3. Adds the capability to notify an ingress BIER router about expected subdomains.
4. Provides a framework to map flow to subdomains using different parameters (DSCP/QoS) and associated overlay signaling.

In a first aspect, a method is provided comprising: at a first router configured to perform Bit Index Explicit Replication (BIER) for forwarding of multicast packets in a network: storing configuration information that indicates that the first router belongs to multiple subdomains of a BIER domain, and is able to forward the multicast packets for a virtual private network on the multiple subdomains; and during an auto-discovery procedure: generating an auto-discovery message to include an auto-discovery route and route attributes that indicate the multiple subdomains; and sending the auto-discovery message to a second router of the virtual private network.

In a second aspect, an apparatus is provided comprising: multiple network input/output interfaces; and a processor of a first router configured to perform Bit Index Explicit Replication (BIER) for forwarding of multicast packets in a network, the processor coupled to the multiple network input/output interfaces and configured to perform: storing configuration information that indicates that the first router belongs to multiple subdomains of a BIER domain, and is able to forward the multicast packets for a virtual private network on the multiple subdomains; and during an auto-discovery procedure: generating an auto-discovery message to include an auto-discovery route and route attributes that indicate the multiple subdomains; and sending the auto-discovery message to a second router of the virtual private network.

In a third aspect, a non-transitory computer readable medium is provided. The computer readable medium is encoded with instructions that, when executed by a processor of a first router configured to perform Bit Index Explicit Replication (BIER) for forwarding of multicast packets in a network, cause the first router to perform: storing configuration information that indicates that the first router belongs to multiple subdomains of a BIER domain, and is able to forward the multicast packets for a virtual private network on the multiple subdomains; and during an auto-discovery procedure: generating an auto-discovery message to include an auto-discovery route and route attributes that indicate the multiple subdomains; and sending the auto-discovery message to a second router of the virtual private network.

In a fourth aspect, a method is provided comprising: at a router in a network: during a Border Gateway Protocol (BGP) procedure: generating a BGP update that includes a BGP route and a tunnel encapsulation attribute that indicate multiple subdomains of a domain of the network on which multicast packets can be forwarded by the router to receiver routers in the network; and sending the BGP update to the receiver routers.

The network may include network devices configured to perform Bit Index Explicit Replication (BIER) multicast forwarding, and the subdomains are BIER subdomains.

The generating may include generating the BGP update to include an Inclusive (I)-Provider Multicast Service Interface (PMSI) (I-PMSI) route as the BGP route, and such that the tunnel encapsulation attribute includes multiple PMSI Tunnel Attributes (PTAs) corresponding to respective ones of the multiple subdomains.

The tunnel encapsulation attribute may include a type-length-value (TLV) element, and the TLV element includes sub-TLVs, and the generating may further include encoding at least some of the multiple PTAs in corresponding ones of the sub-TLVs.

The generating may further include encoding one of the multiple PTAs, but excluding the at least some of the multiple PTAs, in a PMSI attribute.

An apparatus for performing the method of the fourth aspect is also provided. A non-transitory computer readable medium encoded with instructions that, when executed by a processor, cause the processor to perform the method of the fourth aspect is also provided.

In a fifth aspect, a method is provided comprising: at an ingress router configured to perform Bit Index Explicit Replication (BIER) for forwarding of multicast packets in a network: receiving auto-discovery messages that indicate BIER subdomains of a BIER domain of the network to which egress routers that originated the auto-discovery messages respectively belong; constructing mappings between the egress routers and the BIER subdomains to which the egress routers respectively belong based on the auto-discovery messages; and determining a minimum set of the BIER subdomains to which all of the egress routers belong based on the mappings; and forwarding the multicast packets limited to the minimum set of the BIER subdomains to all of the egress routers.

An apparatus for performing the method of the fifth aspect is also provided. A non-transitory computer readable medium encoded with instructions that, when executed by a processor, cause the processor to perform the method of the fifth aspect is also provided.

In a sixth aspect, a method is provided comprising: at an ingress router configured to perform Bit Index Explicit Replication (BIER) forwarding of multicast Internet Protocol (IP) packets in a network: storing mappings between possible values of a predetermined field of an IP header of an IP packet format and different subdomains of a BIER domain; receiving a flow of IP packets from a source; determining a value of the predetermined field in the IP packets; mapping the flow of IP packets to a particular subdomain among the different subdomains based on the value and the mappings; and forwarding the flow of IP packets on the particular subdomain of the network.

The forwarding may include encapsulating each of the IP packets with a tunnel encapsulation that indicates the particular subdomain.

The storing may include storing the mappings to include mappings between possible values of a QoS/DSCP field of the IP header and corresponding ones of the different subdomains.

An apparatus for performing the method of the sixth aspect is also provided. A non-transitory computer readable medium encoded with instructions that, when executed by a processor, cause the processor to perform the method of the sixth aspect is also provided.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    at an ingress router configured to perform Bit Index Explicit Replication (BIER) forwarding of multicast Internet Protocol (IP) packets in a network:
    storing mappings between possible values of a differentiated services code point (DSCP) field (DSCP field) of an Internet Protocol (IP) header of an IP packet format and different subdomains of a BIER domain;
    receiving a flow of IP packets from a source;
    determining a value of the DSCP field in the IP packets;
    mapping the flow of the IP packets to a particular subdomain among the different subdomains based on the value of the DSCP field and the mappings;
    encapsulating each of the IP packets with a BIER tunnel encapsulation that indicates the particular subdomain and the BIER domain; and
    forwarding the flow of the IP packets on the particular subdomain of the network.

2. The method of claim 1, wherein:
    the flow of the IP packets includes multicast IP packets and forwarding includes forwarding the multicast IP packets for a virtual private network (VPN) routing and forwarding (VRF) instance on the particular subdomain of the network.

3. The method of claim 1, further comprising, at the ingress router:
    discovering egress routers of the network on which corresponding ones of the different subdomains are configured,
    wherein forwarding includes forwarding the flow of the IP packets to one of the egress routers on which the particular subdomain is configured based on discovering.

4. The method of claim 3, wherein:
    discovering includes receiving, from the egress routers, Inclusive (I)-Provider Multicast Service Interface (PMSI) (I-PMSI) routes that indicate the different subdomains.

5. The method of claim 1, wherein forwarding includes forwarding the flow of the IP packets to an egress router for the particular subdomain.

6. The method of claim 5, wherein forwarding further includes forwarding the flow of the IP packets using BIER over multiprotocol label switching (MPLS).

7. The method of claim 1, wherein the ingress router is configured with a bit-forwarding router prefix and a unique bit forwarding router identifier.

8. An apparatus comprising:
    multiple network input/output interfaces; and
    a processor of an ingress router configured to perform Bit Index Explicit Replication (BIER) forwarding of multicast Internet Protocol (IP) packets in a network, the processor coupled to the multiple network input/output interfaces and configured to perform:
    storing mappings between possible values of a differentiated services code point (DSCP) field (DSCP field) of an Internet Protocol (IP) header of an IP packet format and different subdomains of a BIER domain;

receiving a flow of IP packets from a source;

determining a value of the DSCP field in the IP packets;

mapping the flow of the IP packets to a particular subdomain among the different subdomains based on the value of the DSCP field and the mappings;

encapsulating each of the IP packets with a BIER tunnel encapsulation that indicates the particular subdomain and the BIER domain; and forwarding the flow of the IP packets on the particular subdomain of the network.

9. The apparatus of claim 8, wherein:
the flow of the IP packets includes multicast IP packets and the processor is configured to perform forwarding by forwarding the multicast IP packets for a virtual private network (VPN) routing and forwarding (VRF) instance on the particular subdomain of the network.

10. The apparatus of claim 8, wherein the processor is further configured to perform:
discovering egress routers of the network on which corresponding ones of the different sub domains are configured,
wherein the processor is configured to perform forwarding by forwarding the flow of the IP packets to one of the egress routers on which the particular subdomain is configured based on discovering.

11. The apparatus of claim 10, wherein:
the processor is configured to perform discovery by receiving, from the egress routers, Inclusive (I)-Provider Multicast Service Interface (PMSI) (I-PMSI) routes that indicate the different subdomains.

12. The apparatus of claim 8, wherein the processor is configured to perform forwarding by forwarding the flow of the IP packets to an egress router for the particular subdomain.

13. The apparatus of claim 12, wherein the processor is further configured to perform forwarding by forwarding the flow of the IP packets using BIER over multiprotocol label switching (MPLS).

14. The apparatus of claim 8, wherein the ingress router is configured with a bit-forwarding router prefix and a unique bit forwarding router identifier.

15. A non-transitory computer readable medium encoded with instructions that, when executed by a processor of an ingress router configured to perform Bit Index Explicit Replication (BIER) forwarding of multicast Internet Protocol (IP) packets in a network, cause the ingress router to perform:

storing mappings between possible values of a differentiated services code point (DSCP) field (DSCP field) of an Internet Protocol (IP) header of an IP packet format and different sub domains of a BIER domain;

receiving a flow of IP packets from a source;

determining a value of the DSCP field in the IP packets;

mapping the flow of the IP packets to a particular subdomain among the different subdomains based on the value of the DSCP field and the mappings;

encapsulating each of the IP packets with a BIER tunnel encapsulation that indicates the particular subdomain and the BIER domain; and forwarding the flow of the IP packets on the particular subdomain of the network.

16. The non-transitory computer readable medium of claim 15, wherein:
the flow of the IP packets includes multicast IP packets and the instructions to cause the ingress router to perform forwarding include instructions to cause the ingress router to perform forwarding the multicast IP packets for a virtual private network (VPN) routing and forwarding (VRF) instance on the particular subdomain of the network.

17. The non-transitory computer readable medium of claim 15, further comprising instructions to cause the ingress router to perform:
discovery of egress routers of the network on which corresponding ones of the different subdomains are configured,
wherein the instructions to cause the ingress router to perform forwarding include instructions to cause the ingress router to perform forwarding the flow of the IP packets to one of the egress routers on which the particular subdomain is configured based on the discovery.

18. The non-transitory computer readable medium of claim 15, wherein the instructions to cause the processor to perform forwarding include instructions to cause the processor to perform forwarding the flow of the IP packets to an egress router for the particular subdomain.

19. The non-transitory computer readable medium of claim 18, wherein the instructions to cause the processor to perform forwarding include further instructions to cause the processor to perform forwarding the flow of the IP packets using BIER over multiprotocol label switching (MPLS).

20. The non-transitory computer readable medium of claim 15, wherein the ingress router is configured with a bit-forwarding router prefix and a unique bit forwarding router identifier.

* * * * *